Dec. 5, 1933. W. W. LIGHTNER 1,937,520
COCKPIT COVER
Filed May 19, 1932 2 Sheets-Sheet 2
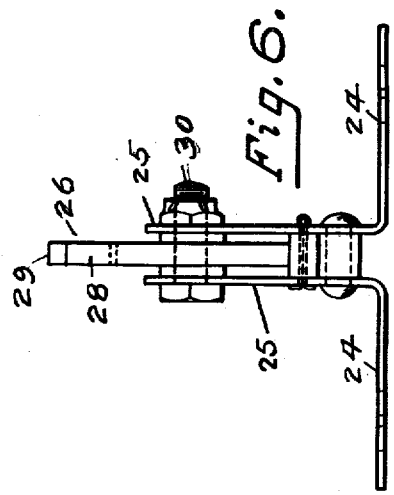
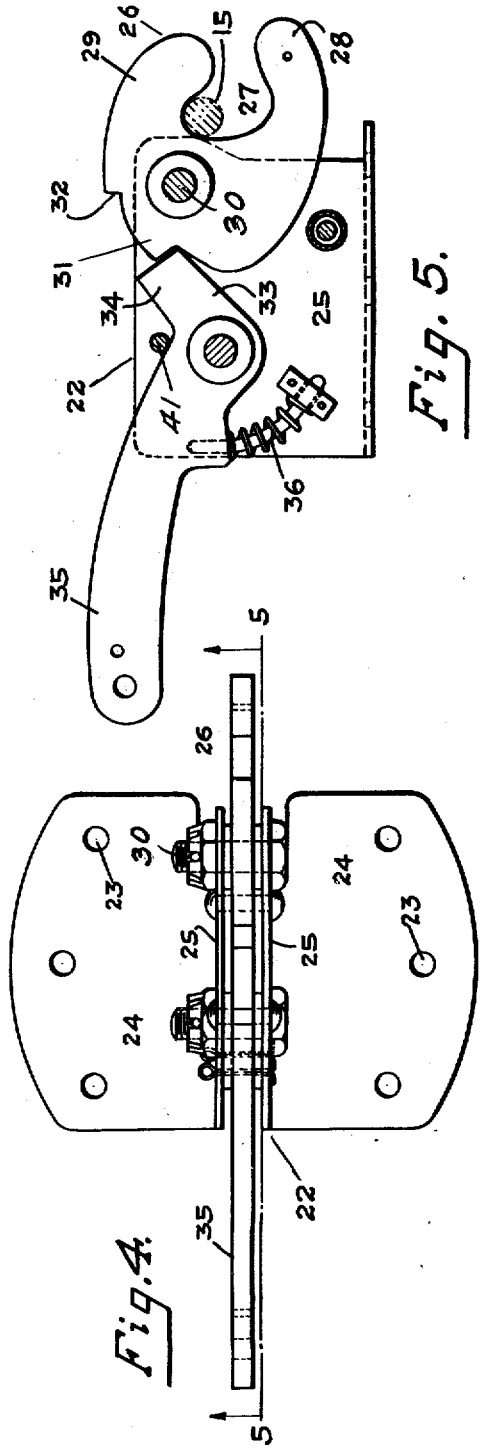
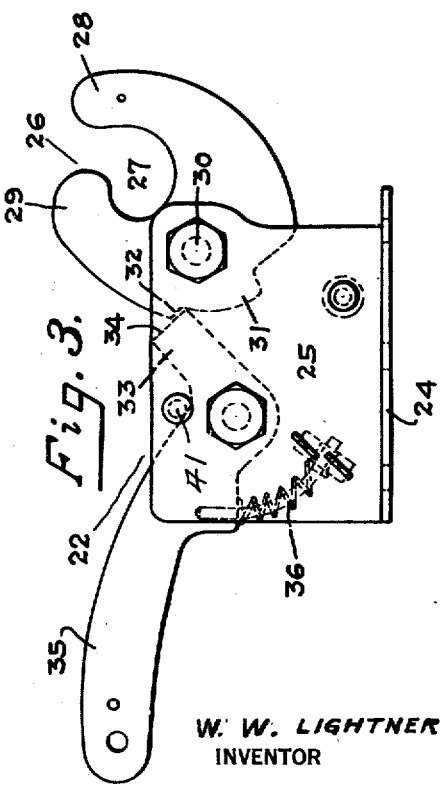
W. W. LIGHTNER
INVENTOR Patented Dec. 5, 1933

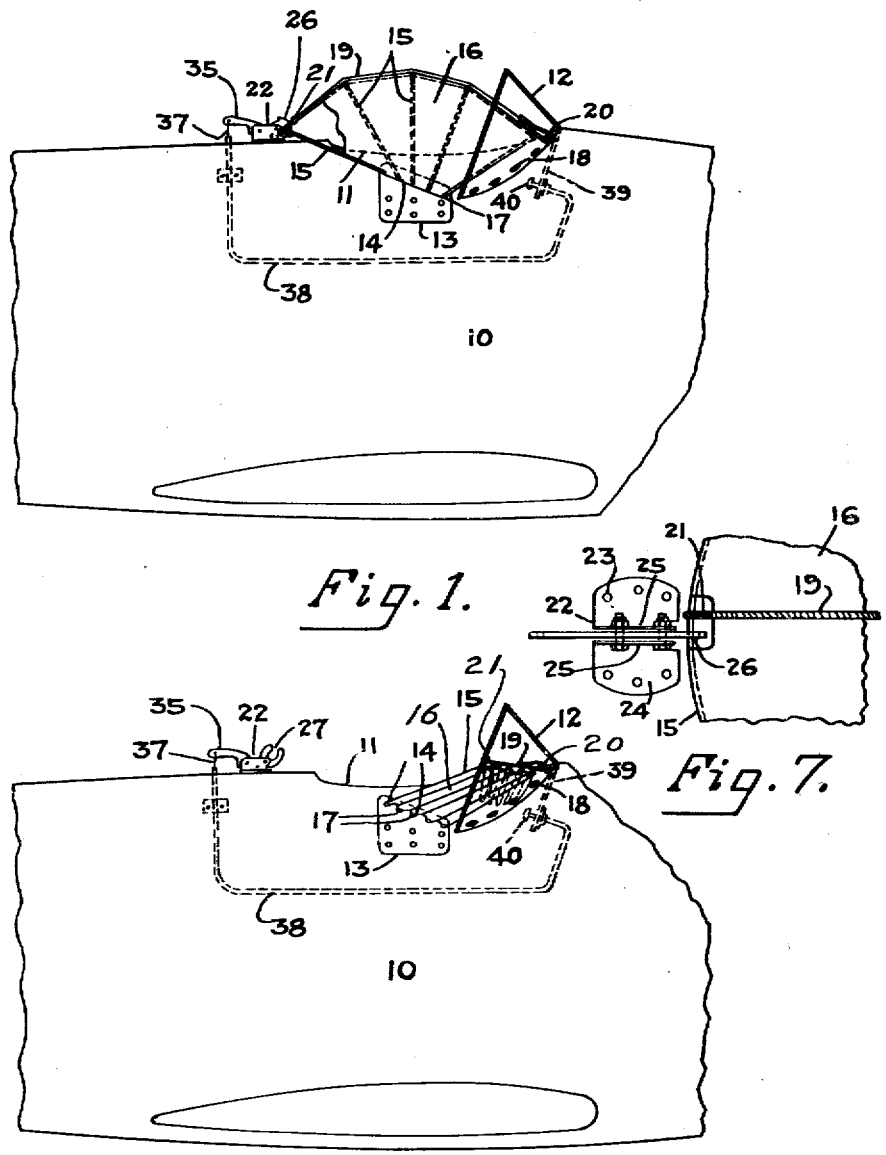

1,937,520

UNITED STATES PATENT OFFICE 1,937,520

COCKPIT COVER

Walter W. Lightner, United States Navy

Application May 19, 1932. Serial No. 612,361

5 Claims. (Cl. 244—30)

(Granted under the act of March 3, 1883, as amended April 30, 1928; 370 O. G. 757)

My invention relates broadly to a cockpit cover and release and more particularly to a quick release catch for cockpit covers on an aircraft.

The principal object of my invention is to provide an aircraft cockpit cover that can be easily and quickly positioned and released for use in blind flying maneuvers.

Another object of my invention being to provide an aircraft cockpit cover having a quick release latch so that the flyer will not experience any difficulty in the removal of the covering in an emergency.

It is also an object of my invention to provide a device that is rugged, light weight, and one that can be easily installed upon the cockpit of an airplane.

With the above and other objects in view, the invention consists in the construction, combination and arrangement of parts as will be described more fully hereinafter.

Reference is to be had to the accompanying drawings forming a part of the specification in which like reference characters indicate corresponding parts throughout the several views and in which:

Figure 1 is a fragmentary side elevation of an airplane fuselage showing my improved cockpit cover in closed position.

Figure 2 is a similar view to Figure 1 showing my cockpit cover in open position.

Figure 3 is an enlarged side elevation of my quick release catch, showing its mechanism in position to receive the rearmost bow of the hood.

Figure 4 is a plan view of my catch with the members in the position shown in Figure 3.

Figure 5 is a vertical section taken on the line 5—5 of Figure 4.

Figure 6 is an end view of my catch with parts in position as in Figure 3.

Figure 7 is a fragmentary plan view of a portion of my hood and the position of my catch relative to engagement with the rearmost bow.

Referring more particularly to the drawings 10 indicates a portion of a fuselage of a conventional type airplane, disclosed more or less diagrammatically, showing one of the cockpits 11 provided with the usual wind shield 12. The fuselage 10 has secured to its sides the bearing plates 13 which receive a series of apertures 17 in the ends 14 of the bows 15 of the hood 16. The hood 16 is preferably made from light canvas which is soft and pliable so as to occupy a small space when folded back under the wind shield 12.

The bows 15 are attached to the side plates as shown. The forward flap of the cover or hood 16 is secured beneath the wind shield 12 by snap button fasteners or the like 18. The shape and number of bows are optional and may be made from light weight rods or tubing.

In order to permit the hood to uncover the cockpit, and to hold the same in inactive position when released I have provided an elastic member 19 installed under a slight tension, one end being secured forward at 20 while the other end is attached to the rearmost bow 15 at 21.

The quick release and securing catch 22 located centrally and at the rear of the cockpit designated and equipped for blind flying, is secured to the cowling by bolts or the like at the apertures 23 located in the flanges 24 of the side plates 25. The catch 22 is provided with a bow engaging contact member 26 having a recess 27 bounded by the actuating jaw 28 and the gripping jaw 29. A bolt 30 connects the member 26 to the plates 25. The contact member 26 is provided with a tooth 31 and an offset stop notch 32.

A trigger member 33 is located back of the member 26 and is provided with a dog 34 for contact with the notch 32 of the member 26 to hold the same in position for receiving the rearmost bow 15 of the hood 16 (see Figure 3) and also for holding the same in locked position after the bow 15 has entered the recess 27 and the hood is in closed position (see Figure 5). An operating lever or handle 35 is also provided for the trigger member 33 which is held in active position by means of the latch spring 36.

The release of the hood can be accomplished in some installations for blind flying by the pilot reaching out from another cockpit and operating the lever or handle 35 direct but I have shown for the purpose of illustration a wire 37 connected to the handle 35 and led around the cockpit through Bowden casing 38 to the instrument board 39 where a button or grip 40 is attached and accessible to the person within the cockpit 11.

The catch should be placed in a cocked position as shown in Figure 3 before the hood is closed. The hood may be then closed in a way that the after bow 15 of the hood 16 strikes the catch 22 and causes the same to be locked in closed position until the member 40 is operated to release the same after completing a maneuver or when an emergency arises.

It will be understood that the above description and accompanying drawings comprehend only the general and preferred embodiment of my invention, and that various changes in construction, proportion and arrangement of parts may be within the scope of the appended claims, and without sacrificing any of the advantages of my invention.

The herein described invention may be manufactured and used by or for the Government of the United States for governmental purposes without the payment to me of any royalties thereon.

What I claim is:

1. In combination, a body portion having a cockpit, a wind shield forward of the cockpit, brackets on the sides of said body, a hood having bow members pivoted to said brackets, a hold-down release catch for quick attachment to and detachment from a bow of said hood, a tension member connected to said hood for causing the same to instantly uncover said cockpit when said catch is actuated, and means for actuating said catch from within said cockpit.

2. In combination, a body portion having a cockpit, a wind shield forward of the cockpit, an instrument board within said cockpit or hatch, brackets on the sides of said body, a hood having a plurality of bow members pivoted to said brackets, a hold-down and release catch for attachment to and detachment from a bow of said hood, a tension member connected to the rearmost bow of said hood for causing the same to instantly uncover said cockpit and partly stow said hood behind said wind-shield when said catch is actuated to release position, a wire connected to a pull button located upon said instrument board for the actuation of said catch from within said body.

3. In combination, a fuselage, a cockpit, brackets on the sides of the fuselage, a windshield surrounding the forward end of said cockpit, a hood having bow members pivotally secured to said brackets, a quick attachment and detachment connection secured to said fuselage, a tension member secured at one end to the rearmost of the bows of said hood and the other end to the fuselage adjacent to said wind-shield, said tension member adapted to cause the folding of said hood partially within the bounds of said wind-shield, and an encased flexible connection having on the end a button within reach of a person from within said fuselage for tripping said release connections.

4. In combination, a bail, a quick release and securing catch comprising a housing, a bail engaging member having one bail retaining lip and one actuating lip bounding an open end crotch, said engaging member having a plurality of stop notches, a lever for releasing a trigger projecting obliquely therefrom for engagement with the stop notches of said engaging member for holding the trigger under tension against the stop notches of said engaging member, and a spring for holding the trigger under tension against the stop notches of said member.

5. In combination, a bail member, a trip latch mechanism comprising a housing, a trigger in said housing, a lever extending from said trigger and beyond said housing, a spring tensioned guide member connected to said lever for forcing said trigger to locked position, a jaw member mounted forward of said trigger having notches for engagement by said trigger for thus limiting the movement of said jaw to active and inactive positions, said jaw having a crotch open at one end and bounded by a bail actuated lip and a bail retaining lip, and bearing members supporting said trigger and jaw member in the housing.

WALTER W. LIGHTNER.